US008265576B2

(12) United States Patent
    Wang

(10) Patent No.: US 8,265,576 B2
(45) Date of Patent: *Sep. 11, 2012

(54) SYSTEMS AND METHODS FOR PROVIDING PRODUCT INFORMATION OVER A CARRIER WAVE

(75) Inventor: Jackson Kit Wang, Toronto (CA)

(73) Assignee: E-Radio USA, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,994

(22) Filed: Sep. 13, 2010

(65) Prior Publication Data

US 2011/0004751 A1    Jan. 6, 2011

Related U.S. Application Data

(63) Continuation of application No. 11/053,145, filed on Feb. 8, 2005, now Pat. No. 7,809,342.

(51) Int. Cl.
    *H04B 1/18*    (2006.01)
(52) U.S. Cl. .................... 455/158.4; 455/12.1; 455/3.01; 455/427; 455/422.1; 455/181.1
(58) Field of Classification Search ................. 45/158.4, 45/12.1, 3.01, 427, 422, 181.1, 186.1; 455/158.4, 455/12.1, 3.01, 427, 422, 181.1, 186.1
    See application file for complete search history.

(56) References Cited

U.S. PATENT DOCUMENTS

| 5,857,156 | A | 1/1999 | Anderson et al. |
| 6,246,672 | B1 | 6/2001 | Lumelsky |
| 6,658,231 | B2 | 12/2003 | Nakatsuyama |
| 7,415,243 | B2 | 8/2008 | Yuhara et al. |
| 7,809,342 | B2 * | 10/2010 | Wang .......................... 455/158.4 |
| 2004/0110522 | A1 | 6/2004 | Howard et al. |

OTHER PUBLICATIONS

ISA/US, International Search Report and Written Opinion dated Dec. 19, 2007 for PCT/US06/04546.
Faller et al., "Technical advances in digital audio radio broadcasting," Proceedings of the IEEE, Aug. 2002, vol. 90, Issue 8, p. 1303-1333. [online] IEEE [retrieved on Jul. 22, 2007] from Internet: http://users.ece.gatech.edu/~juang/Publications/dab.pdf.

* cited by examiner

*Primary Examiner* — Sanh Phu
(74) *Attorney, Agent, or Firm* — Morgan, Lewis & Bockius LLP; Brett Lovejoy

(57) ABSTRACT

A customer relationship management (CRM) method using IBOC-radio signals is provided. A message in the radio signal is parsed to obtain a key. The key is compared to a plurality of stored keys. When the received key matches a stored key, a data structure associated with the message is outputted. A device comprising a lookup table with a plurality of stored keys, a tuner unit that receives a CRM in an IBOC signal, and a controller in electrical communication with the lookup table and tuner is provided. The controller comprises (i) instructions for comparing a key in the CRM to one or more stored keys in the plurality of stored keys and (ii) instructions for permitting the display of a display text associated with the received key when there is a match between the received key and a key in the plurality of stored keys.

29 Claims, 8 Drawing Sheets

| Type | | Logic function |
|---|---|---|
| 1 |  | $C = A \wedge B$ |
| 2 |  | $C = \sim(A \wedge B)$ |
| 3 |  | $C = A \vee B$ |
| 4 |  | $C = \sim(A \vee B)$ |
| 5 |  | $C = A \wedge \sim B,\ C = \sim A \wedge B$ |
| 6 |  | $C = \sim A \vee B,\ C = A \vee \sim B$ |
| 7 |  | $C = \sim(A \leftrightarrow B)$ |
| 8 |  | $C = A \leftrightarrow B$ |

SYSTEMS AND METHODS FOR PROVIDING PRODUCT INFORMATION OVER A CARRIER WAVE

CROSS REFERENCE TO RELATED APPLICATION

The present application claims priority to U.S. patent application Ser. No. 11/053,145, filed Feb. 8, 2005.

1. FIELD OF INVENTION

The present invention relates to systems and methods for implementing a customer relationship management program using a radio carrier wave.

2. BACKGROUND OF INVENTION

Customer relationship management involves the communication of manufacturers or retailers with end users after products have been sold. Such communication is often necessary to ensure customer satisfaction as well as to convey important information such as recall notices. In the automotive setting, for example, car dealers keep track of automobile purchases using mailing lists. Such mailing lists are typically used to send customer satisfaction, alert the customers to new models, and to send advertisements and coupons for automobile service. Further, the mailing lists collected by car dealers are used by car manufactures to send recall notice. However, these lists often are not updated when cars are sold.

In 2003, there were 598 recalls affecting some 30 million cars in the United States, but fewer than half the car owners ultimately find out about such recalls or bring their cars in to get them repaired. To address this problem, state legislators in California are considering putting such recall notices on the vehicle registration forms in order to improve the odds that people will find out about a recall and have their cars fixed free of charge. For example, in California, legislation is being considered to require car manufacturers to provide the Department of Motor Vehicles (DMV) with a list of the vehicles subject to a recall within 90 days and require the DMV to notify car owners about the recall on their annual vehicle registration renewal notice. Current California law already requires car manufacturers to provide this information to the DMV in cases of emissions-related recalls. Car owners affected by those types of recalls are notified on their annual vehicle registration renewal notice from the DMV and can't re-register their car until the defect is repaired.

It has been reported that a lot of car owners don't find out when their car is recalled either because they've moved, they think the notice from a dealer is junk mail, or they aren't the original owner of the car so the recall notice sent out by the manufacturer never gets to them.

Since 1966, the National Highway Traffic Safety Administration (NHTSA) has been responsible for motor vehicle safety in the United States. Once NHTSA orders a recall, manufacturers must contact owners by mail and include details of the safety defect, how the owner can get the car repaired at no cost, and who the owner can contact if they're having trouble getting the repair work done. According to the NHTSA, a record 30.4 million vehicles were recalled in 2004, 61% more than were recalled in 2003.

While the legislation being introduced at the state level in the United States is a step in the right direction, such procedures are still inadequate. For example, consider the case in which a defect that affects the safety of vehicle is discovered. Under the proposed California legislation, some people will not discover this defect until they receive their annual car registration form. Such a delay in notification could result in many accidents and fatalities when the defect is life threatening. Thus, given the above background, what is needed in the art are improved methods for communicating customer relationship management data to end users.

3. SUMMARY OF INVENTION

The present invention addresses the shortcomings found in the prior art. The present invention provides systems and methods for providing customer relationship management in real time using In-Band On-Channel (IBOC) digital audio broadcasting technology. In some embodiments, auxiliary application service functionality within IBOC is exploited in order to target specific end-users and to provide customer relationship management services to such end users. Such services include, but are not limited to, provision of recall notices, advertisements, service reminders, and other forms of communication.

One aspect of the invention encompasses a method of providing customer relationship management in an radio system (e.g., IBOC, RDS, satellite, etc.). A radio signal comprising a data portion is received. Within this data portion is a message. The message is parsed to obtain a key. The key is compared to a plurality of stored keys in a lookup table. When the key matches a stored key in the plurality of stored keys, a data structure associated with the message is outputted (e.g., to an output device). When the key does not match any stored key in the plurality of stored keys, a data structure associated with the message is not outputted. The radio signal can be within the FM or AM frequency spectrum. In some embodiments, the data structure is a display text, an audio segment, or a video segment. In some embodiments, the output device is a speaker, a video display capable of displaying alphanumeric characters, and/or a video display capable of displaying video characters. In some embodiments, the message further comprises the data structure. In some embodiments, the key has a size of 32 bits.

In some embodiments, the message further comprises a received code. A message lookup list, comprising a plurality of stored codes, is searched for a stored code that matches the received code. When a stored code is found in the plurality of codes that matches the received code, the data structure associated with the matching stored code is the data structure that is outputted to the output device. In some embodiments, the code has a size of 8 bits or 16 bits.

In some embodiments, the message is encrypted. In such embodiments, the method further comprises decrypting the message prior to the parsing step. In some embodiments, the method further comprises reading a time slot schedule to identify a permitted time. In such embodiments, the receiving, parsing, and comparing are only performed during the permitted time. In some embodiments, the permitted time is a specified time interval occurring in a time period. In some embodiments, this period is a minute, an hour, a day, a week or a month.

Another aspect of the invention comprises a lookup table comprising (i) a plurality of stored keys, (ii) an output device, (iii) a tuner unit for receiving a radio signal (e.g., IBOC, RDS, satellite) comprising a data portion wherein the data portion comprises a message, and (iv) a decoded digital data controller in electrical communication with the (a) lookup table, (b) the output device, and (c) the tuner unit. The decoded digital data controller comprises instructions for parsing the message to obtain a key and instructions for comparing the key to the plurality of stored keys such that (i) when the key matches a key in the plurality of stored keys, a data structure associated with the message is outputted to an output device, and (ii) when the key does not match any key in the plurality of stored keys, a data structure associated with the message is not outputted to an output device.

Still another aspect of the invention provides a method of providing customer relationship management in a radio system (e.g., IBOC, RDS, satellite). The method comprises receiving a radio signal comprising a data portion. The data portion comprises a message. In the method, the message is parsed to obtain a code. The code is compared to a plurality of stored codes in a message lookup list. A data structure associated with the stored code is then outputted. In some embodiments in accordance with this aspect of the invention, the data structure is a display text, an audio segment, or a video segment. In some embodiments in accordance with this aspect of the invention, the code has a size of 8 bits or 16 bits. In some embodiments, the message is encrypted and the method further comprises decrypting the message prior to the parsing step.

Still another aspect of the invention provides a device comprising (i) a message lookup list comprising a plurality of stored codes, (ii) an output device, (iii) a tuner unit for receiving a radio signal (e.g., IBOC, RDS, satellite) comprising a data portion comprising a message, (iv) a decoded digital data controller in electrical communication with (a) the message lookup list, (b) the output device, and (c) the tuner unit. The decoded digital data controller comprises instructions for parsing the message to obtain a code, instructions for comparing the code to the plurality of stored codes, and instructions for outputting a data structure associated with the stored code to the output device. In some embodiments in accordance with this aspect of the invention, the device further comprises a time slot schedule and the decoded digital data controller further comprises instructions for reading a time slot schedule to identify a permitted time. In such embodiments, the instructions for parsing and the instructions for comparing are only performed during the permitted time.

Still another aspect of the invention provides a radio comprising (i) a lookup table having a plurality of stored keys, (ii) a tuner unit for receiving a customer relationship message in a signal, (iii) a decoded digital data controller in electrical communication with the tuner unit and the lookup table. The decoded digital data controller comprises instructions for comparing a received key in the customer relationship message to one or more stored keys in the plurality of stored keys and instructions for permitting the display of a display text associated with the received key when there is a match between the received key and a key in the plurality of stored keys.

Yet another aspect of the invention provides a radio comprising (i) a message lookup list having a plurality of codes, (ii) a tuner unit for receiving a customer relationship message in a signal (e.g., IBOC, RDS, satellite, etc.), (iii) a decoded digital data controller in electrical communication with the tuner unit and the lookup table, the decoded digital data controller comprising (a) instructions for comparing a received code in the customer relationship message to one or more stored code in the plurality of stored codes and (ii) instructions for permitting the display of a display text associated with a stored code in the plurality of stored keys when there is a match between the stored code and the received code.

4. BRIEF DESCRIPTION OF THE FIGURES

Like reference numerals refer to corresponding parts throughout the several views of the drawings.

5. DETAILED DESCRIPTION OF THE INVENTION

Figure 1:
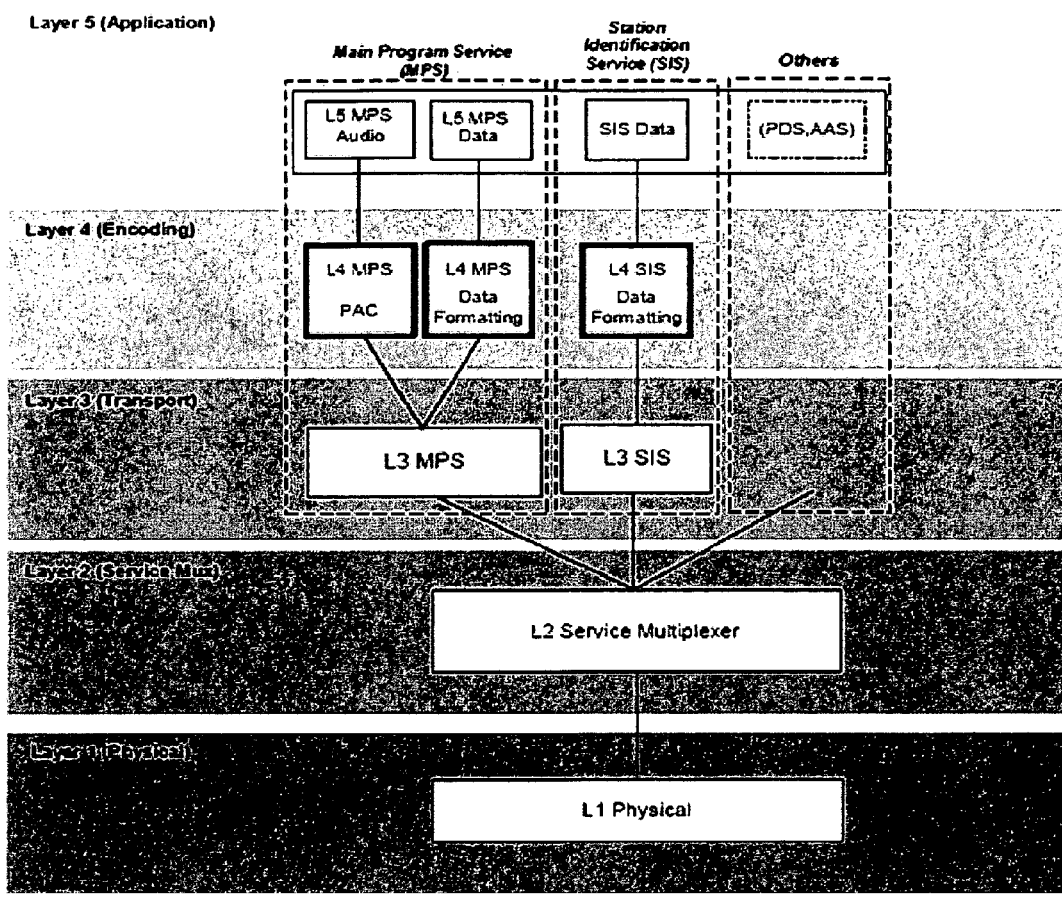
FIG. 1 illustrates the In-Band On-Channel (IBOC) protocol stack in accordance with the prior art.

The present invention addresses the shortcomings found in the prior art. The present invention provides systems and methods for providing customer relationship management in real time using In-Band On-Channel (IBOC) digital audio broadcasting technology. In some embodiments, auxiliary application service functionality within IBOC is exploited in order to target specific end-users and to provide customer relationship management services to such end users. Such services include, but are not limited to, provision of recall notices, advertisements, service reminders, and other forms of communication.

5.1 IBOC

In-Band On-Channel digital audio broadcasting provides significant bandwidth for not only music, but other forms of information as well. In-Band On-Channel (IBOC) digital audio broadcasting systems radio technology is an upgrade to the way AM and FM radio signals are transmitted, from analog to digital signals. IBOC allows broadcasters to transmit a high-quality digital signal. For listeners, the benefits of IBOC radio are (i) FM radio with CD-quality sound, (ii) AM radio that sounds as good as FM, (iii) radio reception without static, pops, crackles or fades, and (iv) ability to transmit additional information along with the music signal. Typically, this additional information takes the form of scrolling text on an IBOC receiver's display, such as a song's artist and title, station call letters, and advertising information. However, this additional information can be any form of auxiliary application services (AAS). For example, while listening to a news show, financial updates can be transmitted to the radio. Further, radio stations can include local and regional information, such as weather updates or even traffic alerts.

5.2 General Properties of IBOC

In some forms of IBOC, a radio station sends out the analog and a digital signal. In such forms of IBOC, new digital signals are broadcast as "sideband" transmissions bracketing the top and bottom of the current "host" analog signal in order to make optimal usage of the current spectrum allocations. As such, IBOC refers to a method of transmitting a digital radio broadcast signal centered on the same frequency as the AM or FM station's present frequency. For FM stations, the transmission of the digital signal occupies the sidebands above and below the center FM frequency (e.g., 97.9 MHz). AM band transmissions also place the digital signal in sidebands above and below the existing AM carrier frequency. By this means, the AM or FM station digital signal is transmitted in addition to the existing analog signal. In both instances, the digital emissions fall within the spectral emission mask of the AM or FM channel. With more than half of the radio stations in the United States currently facing interference from adjacent stations, this approach delivers redundant information on both sides of the current channel location in order to ensure optimal performance in all listening environments. Furthermore, the digital signal includes an additional information signal in order to communicate information independent of the main signal. The digital signals are compressed before being transmitted. The three-layered signal (analog main, digital main, and digital informational auxiliary) is transmitted from the radio station's upgraded digital transmitter. Multipath interference, caused by the signal reflecting off of buildings, is ignored by the digital radio, which is able to discern the true signal and ignore interference. The radio receiver receives the signal and, depending on the configuration of the radio, one hears either the digital or analog feed. An example of an HD radio tuner is the Kenwood KTC-HR100 HD Radio™ tuner.

5.3 IBOC Protocol Stack

IBOC system offers four basic program services in a single FM assignment or a single AM assignment. They are (i) a main program service (MPS), (ii) a personal data service (PDS), (iii) a station identification service (SIS), and (iv) an auxiliary application service (AAS). The main program service (MPS) preserves the existing legacy analog radio-programming formats in both analog and digital transmissions. Unlike MPS, which broadcasts the same audio program to all listeners, the personal data service (PDS) enables users to select the data services desired and when they are presented. The station identification service (SIS) provides the necessary control and identification information, which indirectly accommodates user search and selection of the IBOC digital radio stations and their supporting services. The auxiliary application service (AAS) allows a virtually unlimited number of custom and specialized IBOC digital radio applications to coexist concurrently.

Support for the above services is provided via a layered protocol stack illustrated in FIG. 1. This layered protocol stack is based on the International Organization Opens Systems Interconnection (ISO OSI) layered model. See, for example, ISO 7498, "Opens Systems Interconnection (OSI) Basic Reference Model," which is hereby incorporated by reference in its entirety. Layer 5 (Application) accepts content from the broadcasting station (e.g., program source). Layer 4 (Encoding) performs the necessary audio compression or data formatting of the various source materials. Layer 3 (Transport) provides one or more application specific protocols tailored to provide robust and efficient transfer of Layer 4 data. Layer 2 (Service Mux) provides limited error detection and addressing. Its main function is to format the data received from Layer 3 into discrete transfer frames for processing by Layer 1. Layer 1 (Physical Layer) provides the modulation, FEC, framing, and signaling necessary to convert the digital data received from the higher layers into an AM or FM IBOC waveform for transmission in the appropriate band.

Digital data and audio cannot be directly propagated over radio frequency (RF) channels. Therefore, a modulator is used to modulate the digital information onto a radio frequency carrier. Both AM and FM IBOC systems employ Orthogonal Frequency Division Multiplexing. See, for example, Chang, "High-speed multichannel data transmission with bandlimited orthogonal signals," Bell sys. Tech. J. 45:1775-1796, December 1996, Weinstein and Ebert, "Data transmission by frequency-division multiplexing using the discrete Fourier transform," IEEE Trans. on Comm. Tech., vol. COM-19, pp. 628-634, October, 1971, and Saltzberg, "Performance of an efficient parallel data transmission system," IEEE Trans. on Comm. Tech., vol. COM-15, pp. 805-811; Johnson, "The Structure and Generation of Robust Waveforms for AM In Band On Channel Digital Broadcasting," http://www.armstrongtx.com/BroadProd/Dt1DigitalFM.htm; Peyla, "The Structure and Generation of Robust Waveforms for AM In-Band On-Channel Digital Broadcasting," http://www.armstrongtx.com/BroadProd/Dt1DigitalFM.htm, each of which is hereby incorporated by reference in its entirety. OFDM is a parallel modulation scheme in which the data streams modulate a large number of orthogonal subcarriers that are transmitted simultaneously.

IBOC offers different systems or protocols: hybrid, extended hybrid, and all digital. The three waveform characteristics, or spectra, are basically similar but have some clearly defined differences. However, each system's spectrum is divided into a diverse number of sidebands, which represent different orthogonal frequency division multiplexing (OFDM) subcarrier groups.

5.4 FM IBOC Overview

One of the major differences between IBOC and other single carrier digital systems is the use of frequency partitions. Each partition consists of 18 data subcarriers and one reference subcarrier. The manner in which the subcarriers are handled depends on whether the IBOC system in use is the hybrid, extended hybrid or all digital.

Figure 2:
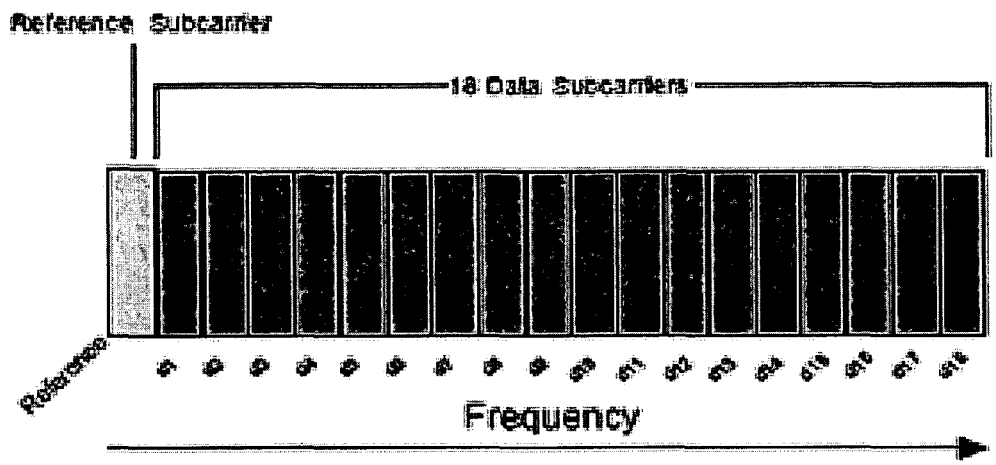
FIG. 2 illustrates a first possible ordering for an orthogonal frequency division multiplexing (OFDM) subcarrier assembly in accordance with the prior art.
Figure 3:
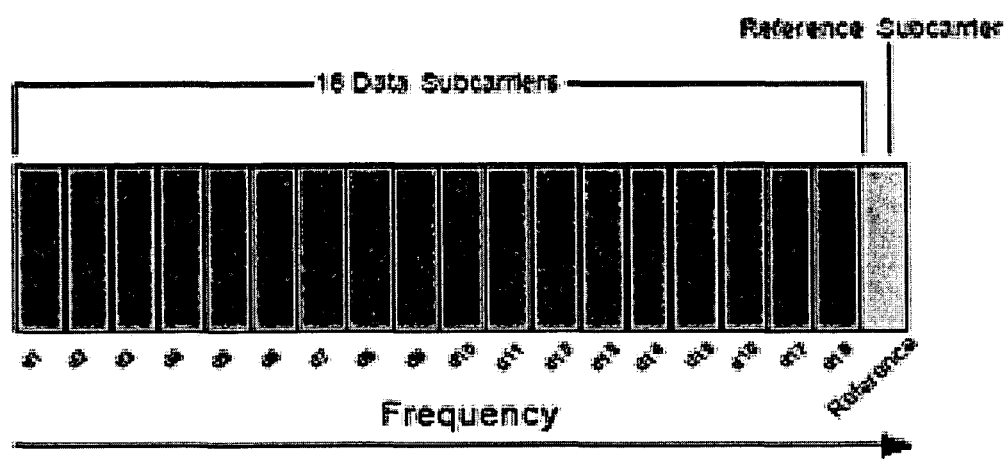
FIG. 3 illustrates a second possible ordering for an orthogonal frequency division multiplexing (OFDM) subcarrier assembly in accordance with the prior art.

The OFDM subcarriers are assembled into one of two possible orderings, that of FIG. 2 (ordering A) and that of FIG. 3 (ordering B). The position of the reference subcarrier (ordering A or B) varies with the location of the frequency partition within the spectrum. See, for example, Kroeger and Cammarata, 1997, "Robust Modem and Coding Techniques for FM Hybrid IBOC DAB," IEEE Transactions on Broadcasting 43:412-142, which is hereby incorporated by reference in its entirety.

For each frequency partition, data subcarriers $d1$ through $d18$ convey digital program content, while the reference subcarrier conveys system control. OFDM subcarriers are numbered from 0 at the center frequency to ±546 at either end of the channel frequency allocation.

Besides the above-described reference subcarrier resident within each frequency partition, depending on the service name implies the all-digital system does not use any analog signal at all. The bandwidth of the sidebands from the main digital signal is expanded and lower power secondary sidebands are inserted in the space formerly used by the analog signal.

Figure 6:
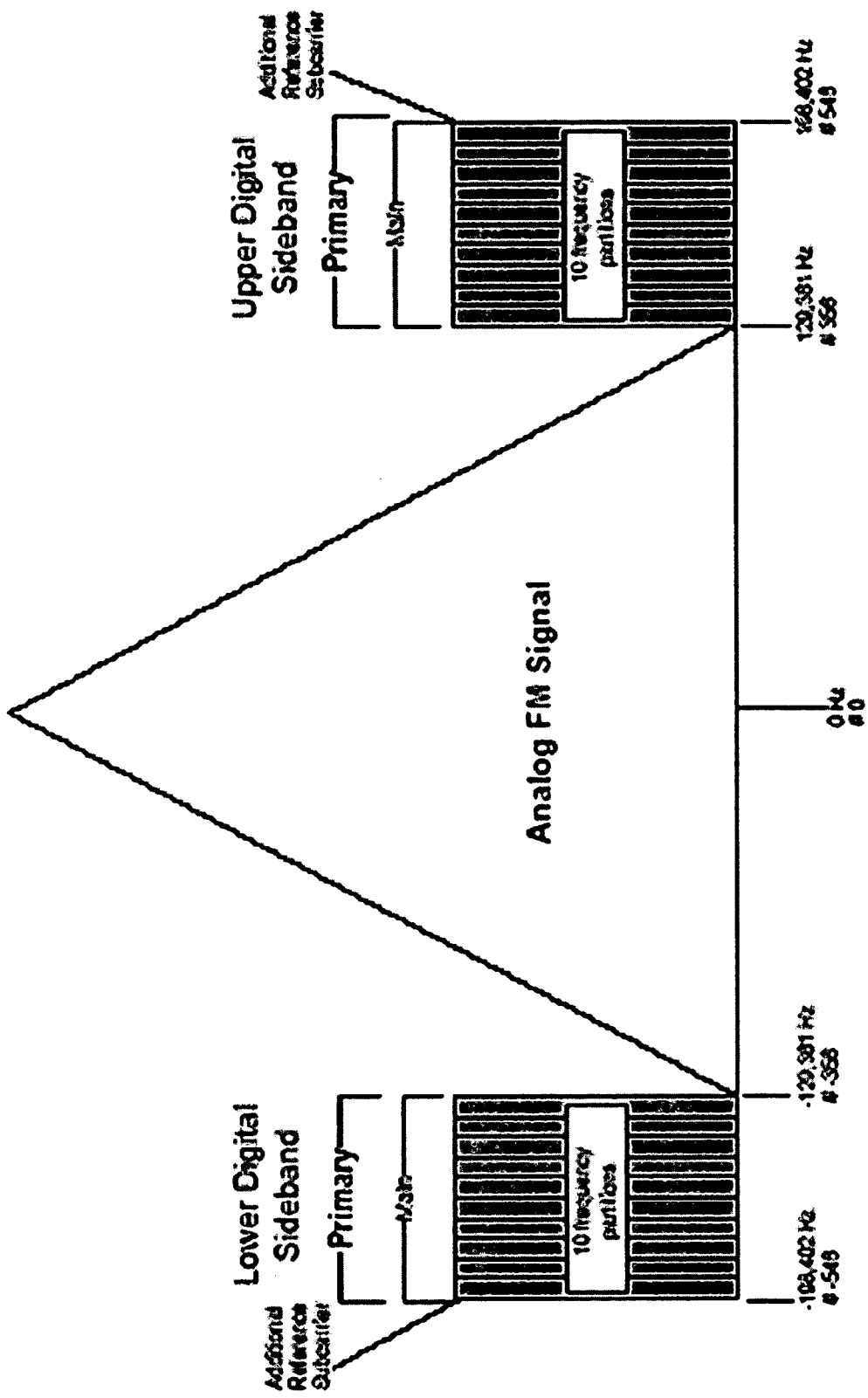
FIG. 6 illustrates a spectrum of the IBOC FM hybrid waveform in accordance with the prior art.

Hybrid operation. In the hybrid waveform, the digital signal is transmitted in primary main (PM) sidebands on either side of the analog FM signal, as shown in FIG. 6. The analog signal may be monophonic or stereo, and may include SCA channels. Each PM sideband is comprised of ten frequency partitions, which are allocated among subcarriers 356 through 545, or −356 through −545. Subcarriers 546 and −546, also included in the PM sidebands, are additional reference subcarriers. Table 1 summarizes the upper and lower primary main sidebands for the hybrid waveform.

The power spectral density of each OFDM subcarrier in the PM sideband, relative to the host analog power, is given in Table 1. A value of 0 dB would produce a digital subcarrier whose power was equal to the total power in the unmodulated analog FM carrier. The value was chosen so that the total average power in a primary main digital sideband (upper or lower) is 23 dB below the total power in the unmodulated analog FM carrier.

TABLE 1

FM IBOC Hybrid Waveform Spectral Summary

| Sideband | Number of Frequency Partitions | Frequency Partition Ordering | Subcarrier Range | Subcarrier Frequencies (Hz from channel center) | Frequency Span (Hz) | Power Spectral Density (dBc per subcarrier) | Comments |
|---|---|---|---|---|---|---|---|
| Upper Primary Main | 10 | A | 356 to 546 | 129,361 to 198,402 | 69,041 | −45.8 | Includes additional reference subcarrier 546 |
| Lower Primary Main | 10 | B | −356 to −546 | −129,361 to −198,402 | 69,041 | −45.8 | Includes additional reference subcarrier −546 | mode, up to five additional reference subcarriers are inserted into the spectrum at subcarrier numbers −546, −279, 0, 279, and 546. The overall effect is a regular distribution of reference subcarriers throughout the spectrum.

Figure 4:
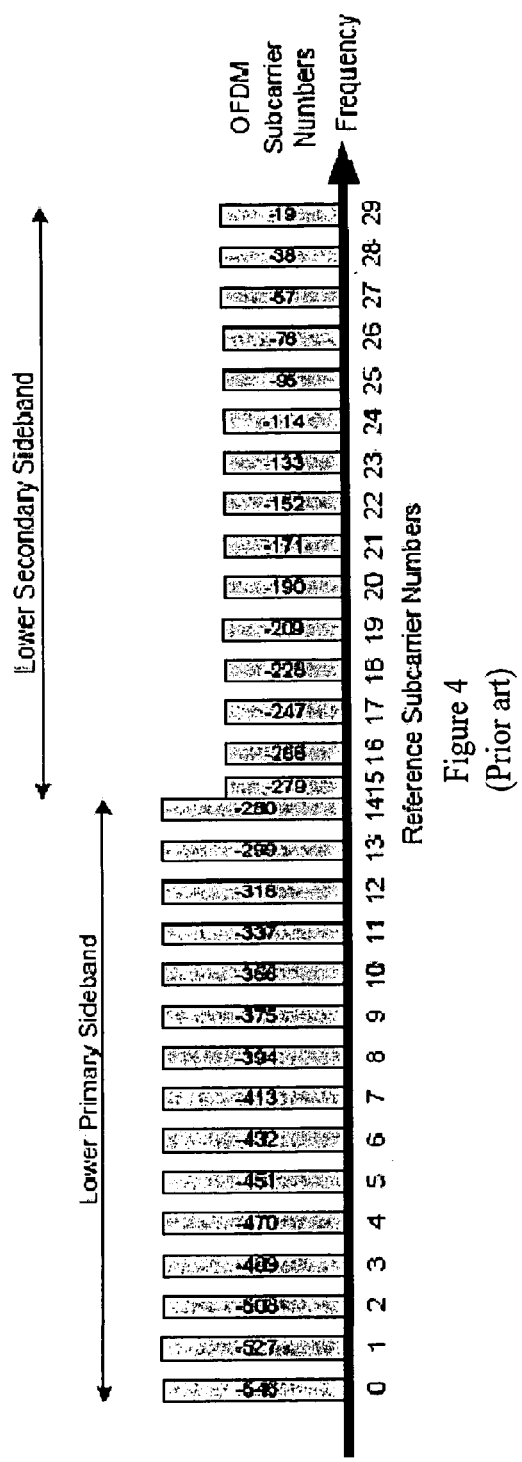
FIG. 4 illustrates the notation for IBOC lower sideband reference subcarriers in accordance with the prior art.
Figure 5:
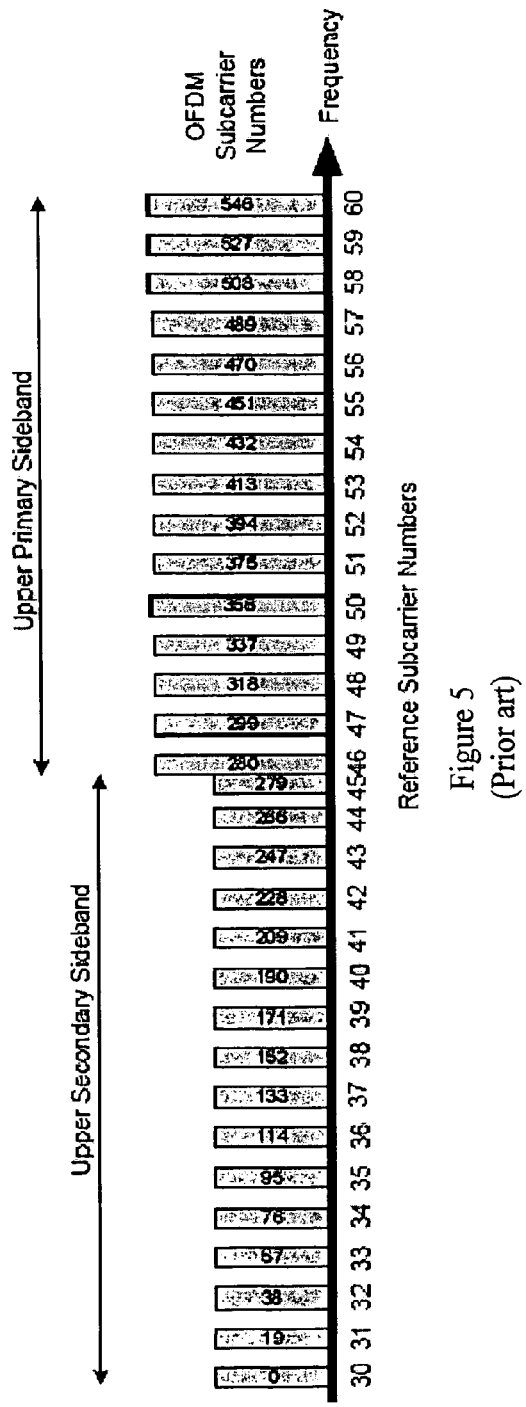
FIG. 5 illustrates the notation for IBOC upper sideband reference subcarriers in accordance with the prior art.

For notational convenience, each reference subcarrier is assigned a unique identification number between 0 and 60. All lower sideband reference subcarriers are shown in FIG. 4. All upper sideband reference subcarriers are shown in FIG. 5. The figures indicate the relationship between reference subcarrier numbers and OFDM subcarrier numbers.

Each spectrum described in this section shows the subcarrier number and center frequency of certain key OFDM subcarriers. The center frequency of a subcarrier is calculated by multiplying the subcarrier number by the OFDM subcarrier spacing $\Delta f \approx 363.373$ Hz. The center of subcarrier 0 is located at 0 Hz. In this context, center frequency is relative to the radio frequency (RF) allocated channel.

Figure 7:
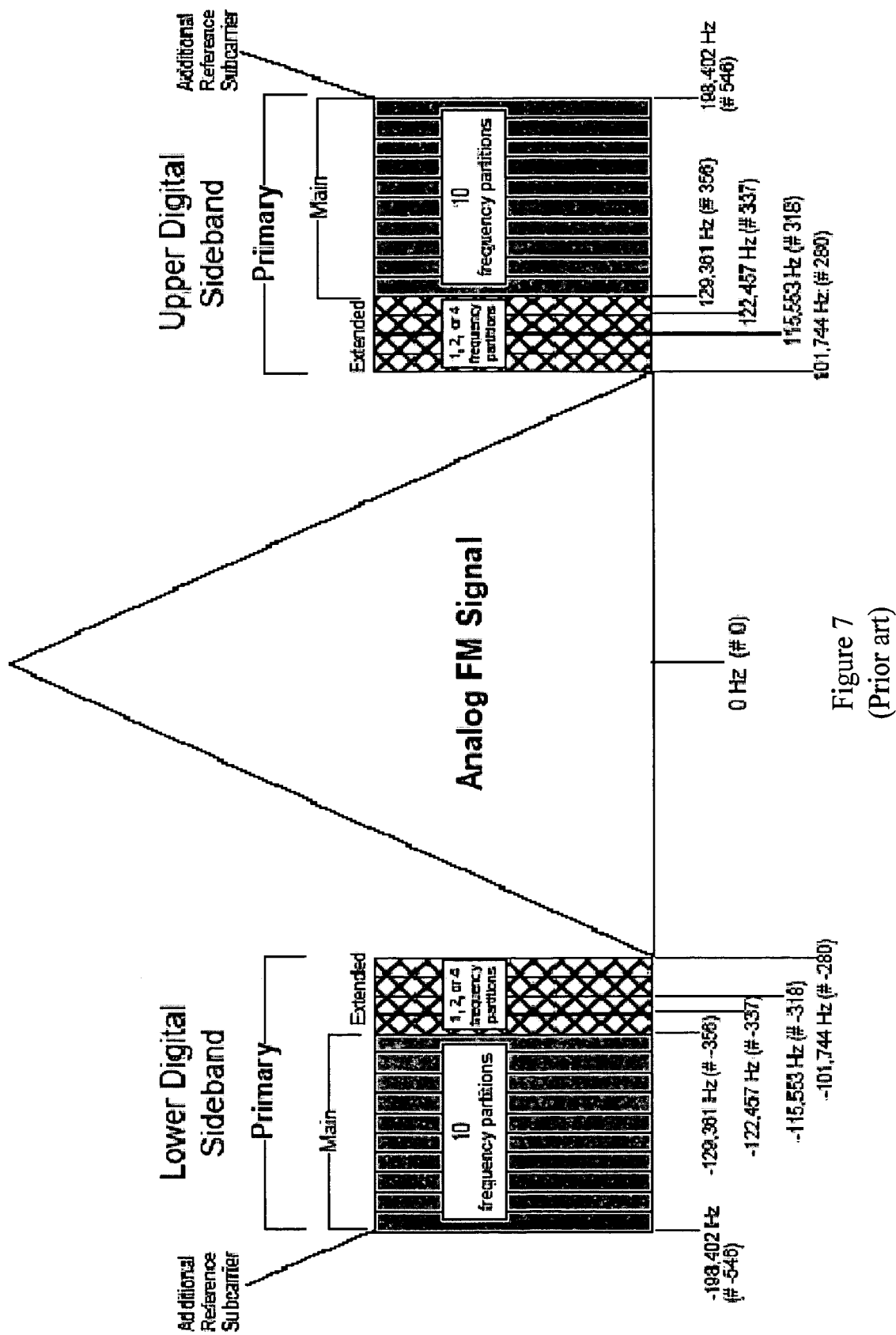
FIG. 7 illustrates a spectrum of the IBOC FM extended hybrid waveform in accordance with the prior art.

The first two waveforms, hybrid and extended hybrid use an analog FM signal and differ in the sideband usage. As its Extended hybrid operation. To operate in the extended hybrid condition, OFDM subcarriers are added to the primary main sidebands in the normal hybrid configuration. As many as four frequency partitions can be added between the edge of each primary main sidebands and the analog signal. See, for example, FIG. 7. These extensions are called the primary extended PX sideband. The channel width is greater but still within the FCC's requirements. Depending on the service mode, one, two, or four frequency partitions can be added to the inner edge of each primary main sideband. Table 2 summarizes the upper and lower primary sidebands for the extended hybrid waveform.

The power spectral density of each OFDM subcarrier in the PM and PX sidebands, relative to the host analog power, is given in Table 2. Like the hybrid waveform, the value was chosen so that the total average power in a primary main sideband (upper or lower) is 23 dB below the total power in the unmodulated analog FM carrier. The level of the subcarriers in the PX sidebands is equal to the level of the subcarriers in the PM sidebands.

TABLE 2

FM IBOC Extended Hybrid Waveform Spectral Summary

| Sideband | Number of Frequency Partitions | Frequency Partition Ordering | Subcarrier Range | Subcarrier Frequencies (Hz from channel center) | Frequency Span (Hz) | Power Spectral Density (dBc per subcarrier) | Comments |
|---|---|---|---|---|---|---|---|
| Upper Primary Main | 10 | A | 356 to 546 | 129,361 to 198,402 | 69,041 | −45.8 | Includes additional reference subcarrier 546 |
| Lower Primary Main | 10 | B | −356 to −546 | −129,361 to −198,402 | 69,041 | −45.8 | Includes additional reference subcarrier −546 |
| Upper Primary Extended (1 frequency partition) | 1 | A | 337 to 355 | 122,457 to 128,997 | 6,540 | −45.8 | None |
| Lower Primary Extended (1 frequency partition) | 1 | B | −337 to −355 | −122,457 to −128,997 | 6,540 | −45.8 | None |
| Upper Primary Extended (2 frequency partitions) | 2 | A | 318 to 355 | 115,553 to 128,997 | 13,444 | −45.8 | None |
| Lower Primary Extended (2 frequency partitions) | 2 | B | −318 to −355 | −115,553 to −128,997 | 13,444 | −45.8 | None |
| Upper Primary Extended (4 frequency partitions) | 4 | A | 280 to 355 | 101,744 to 128,997 | 27,253 | −45.8 | None |
| Lower Primary Extended (4 frequency partitions) | 4 | B | −280 to −355 | −101,744 to −128,997 | 27,253 | −45.8 | None |

Figure 8:
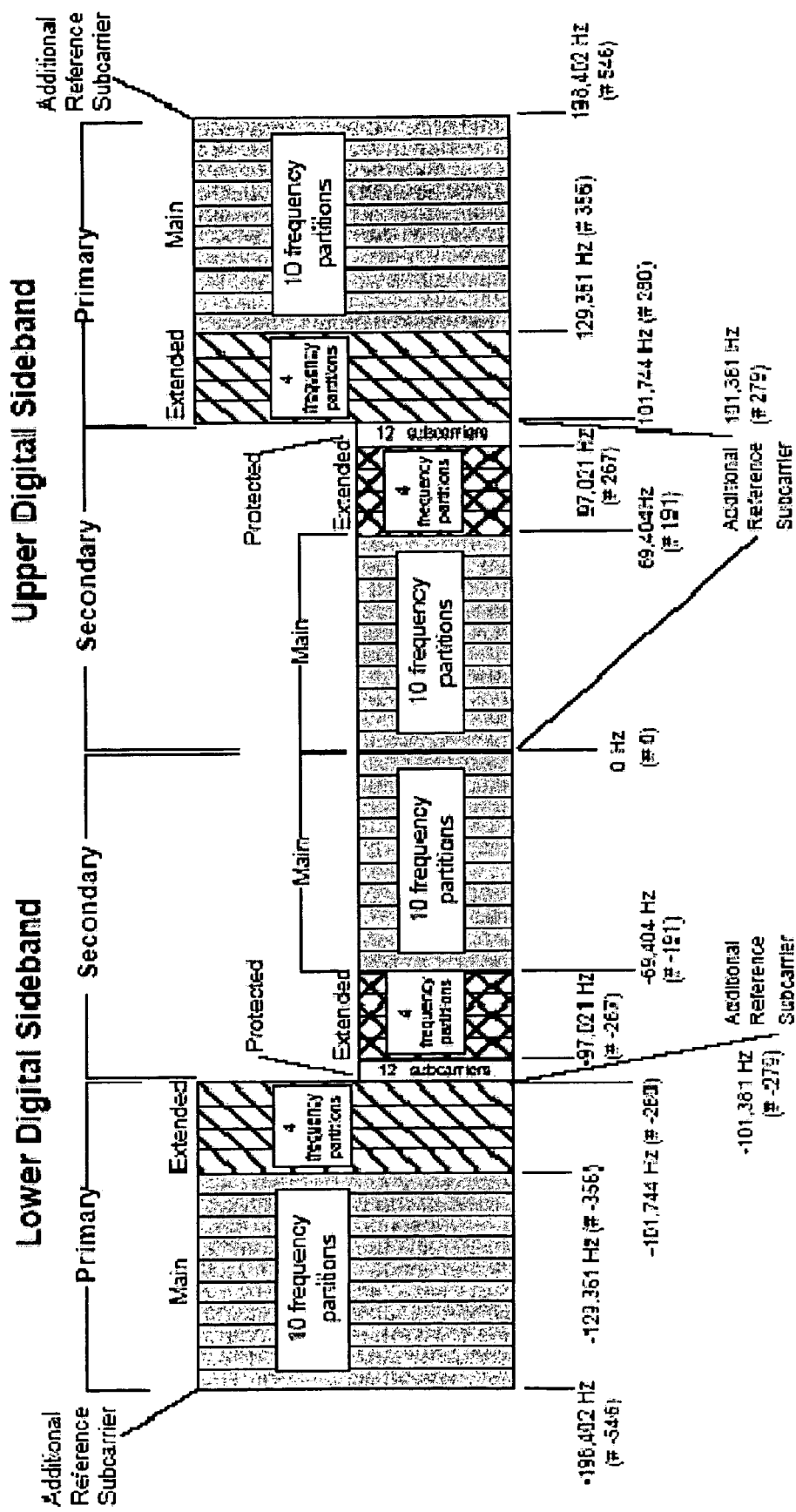
FIG. 8 illustrates a spectrum of the IBOC FM all digital waveform in accordance with the prior art.

All-digital FM operation. The all digital waveform is constructed by disabling the analog signal, fully expanding the bandwidth of the primary digital sidebands, and adding lower-power secondary sidebands in the spectrum vacated by the analog signal. The spectrum of the all digital waveform is shown in FIG. 8.

In addition to the ten main frequency partitions, all four extended frequency partitions are present in each primary sideband of the all digital waveform. Each secondary sideband also has ten secondary main (SM) and four secondary extended (SX) frequency partitions. Unlike the primary sidebands, however, the secondary main frequency partitions are mapped nearer to channel center with the extended frequency partitions farther from the center.

Each secondary sideband also supports a small secondary protected (SP) region consisting of 12 OFDM subcarriers and reference subcarrier 279 or −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions as defined in FIG. 2 and FIG. 3.

The total frequency span of the entire all digital spectrum is 396,803 Hz. Table 3 summarizes the upper and lower, primary and secondary sidebands for the all digital waveform. The power spectral density of each OFDM subcarrier is given in Table 3. As with the hybrid and extended hybrid waveforms, the values are relative to the level of the unmodulated analog FM carrier that is allocated for a particular broadcaster (even though the analog carrier is not transmitted in the all digital waveform).

The primary sideband level sets the total average power in a primary digital subcarrier at least 10 dB above the total power in a hybrid primary digital subcarrier. Any one of four power levels may be selected for application to the secondary sidebands. The four secondary power levels set the power spectral density of the secondary digital subcarriers (upper and lower) in the range of 5 to 20 dB below the power spectral density of the all digital primary subcarriers. A single secondary power level is evenly applied to all secondary sidebands.

TABLE 3

All Digital Waveform Spectral Summary

| Sideband | Number of Frequency Partitions | Frequency Partition Ordering | Subcarrier Range | Subcarrier Frequencies (Hz from channel center) | Frequency Span (Hz) | Power Spectral Density (dBc per subcarrier) | Comments |
|---|---|---|---|---|---|---|---|
| Upper Primary Main | 10 | A | 356 to 546 | 129,361 to 198,402 | 69,041 | −35.8 | Includes additional reference subcarrier 546 |
| Lower Primary Main | 10 | B | −356 to −546 | −129,361 to −198,402 | 69,041 | −35.8 | Includes additional reference subcarrier −546 |
| Upper Primary Extended | 4 | A | 280 to 355 | 101,744 to 128,997 | 27,253 | −35.8 | None |
| Lower Primary Extended | 4 | B | −280 to −355 | −101,744 to −128,997 | 27,253 | −35.8 | None |
| Upper Secondary Main | 10 | B | 0 to 190 | 0 to 69,041 | 69,041 | −40.8, −45.8, −50.8, −55.8 | None |
| Lower Secondary Main | 10 | A | −1 to −190 | −363 to −69,041 | 68,678 | −40.8, −45.8, −50.8, −55.8 | None |
| Upper Secondary Extended | 4 | B | 191 to 266 | 69,404 to 96,657 | 27,253 | −40.8, −45.8, −50.8, −55.8 | None |
| Lower Secondary Extended | 4 | A | −191 to −266 | −69,404 to −96,657 | 27,253 | −40.8, −45.8, −50.8, −55.8 | None |
| Upper Secondary Protected | N/A | N/A | 267 to 279 | 97,021 to 101,381 | 4,360 | −40.8, −45.8, −50.8, −55.8 | Includes additional reference carrier 279 |
| Lower Secondary Protected | N/A | N/A | −267 to −279 | −97,021 to −101,381 | 4,360 | −40.8, −45.8, −50.8, | Includes additional reference |

5.5 FM IBOC Service Modes

The FM IBOC transmission system is configured through primary and secondary service modes, analog diversity delay, and sideband power levels. The system configuration determines how the various logical channels are combined to generate the transmitted waveform.

The service modes dictate the performance and configuration of the logical channels, which carry program content through layer 1. There are two types of service modes: primary service modes, which configure primary logical channels, and secondary service modes, which configure secondary logical channels. The seven primary service modes are MP1, MP2, MP3, MP4, MP5, MP6, and MP7. The four secondary service modes are MS1, MS2, MS3, and MS4.

Service mode MP1 is used to broadcast the hybrid waveform. Service modes MP2 through MP4 increase the capacity of the hybrid waveform by adding one, two, or four extended frequency partitions to each primary sideband. Service modes MP5 through MP7 employ all primary extended frequency partitions, and are used to broadcast the extended hybrid or all digital waveform. Service modes MS1 through MS4 configure the secondary sidebands in the all digital waveform. The allowable service modes for each FM IBOC waveform type are summarized in Table 4.

TABLE 4

Allowable service modes for FM IBOC waveforms

| Waveform | Primary Service Modes | Secondary Service Modes |
|---|---|---|
| Hybrid | MP1 | None |
| Extended Hybrid | MP2-MP7 | None |
| All Digital | MP5-MP7 | MS1-MS4 |

All waveforms require the definition of a primary and a secondary service mode. If secondary sidebands are not present (as in the hybrid or extended hybrid waveform), the secondary service mode is set to "None." Service modes MP1 through MP4 are invalid for the all digital waveform. Only primary service modes MP5 through MP7 can be paired with secondary service modes MS1 through MS4 when broadcasting the all digital waveform. Any combination of these primary and secondary service modes is allowable. Table 4 indicates that there are up to 19 possible combinations of service modes, thereby providing ample flexibility to the broadcaster.

5.6 FM IBOC Logical Channels

A logical channel is a signal path that conducts program content through layer 1 with a specific grade of service, as determined by the service mode. There are ten logical channels, although not all are used in every service mode. The variety of logical channels reflects the inherent flexibility of the system. There are four primary logical channels, denoted as P1, P2, P3, and PIDS. There are six secondary logical channels that are used only with the all digital waveform. They are denoted as S1, S2, S3, S4, S5, and SIDS. Logical channels P1 through P3 and S1 through S5 are designed to convey digital audio and data, while the PIDS and SIDS logical channels are designed to carry IBOC data service (IDS) information.

The performance of each logical channel is completely described through three characterization parameters: throughput, latency, and robustness. The service mode sets these characterization parameters by defining the spectral mapping, interleaver depth, diversity delay, and channel encoding for each active logical channel.

Throughput. Throughput defines the layer 1 audio or data capacity of a logical channel, excluding upper layer framing overhead. The block-oriented operations of layer 1 (such as interleaving) require that it process data in discrete transfer frames, rather than continuous streams. As a result, throughput is calculated as the product of transfer frame size and transfer frame rate. Spectral mapping and channel code rate determine the throughput of a logical channel, since spectral mapping limits capacity and coding overhead limits information throughput.

Latency. Latency is the delay that a logical channel imposes on a transfer frame as it traverses layer 1. The latency of a logical channel is defined as the sum of its interleaver depth and diversity delay. It does not include processing delay or delays through higher protocol layers. The interleaver depth determines the amount of delay imposed on a logical channel by its interleaver. Diversity delay is also applied to some logical channels to improve robustness. For example, in some service modes, logical channel P1 presents dual processing paths; one path is delayed and the other is not.

Robustness. Robustness is the ability of a logical channel to withstand channel impairments such as noise, interference, and fading. There are eleven relative levels of robustness in the FM IBOC system. A robustness of 1 indicates a very high level of resistance to channel impairments, while an 11 indicates a lower tolerance for channel-induced errors.

Spectral mapping, channel code rate, interleaver depth, and diversity delay determine the robustness of a logical channel. Spectral mapping affects robustness by setting the relative power level, spectral interference protection, and frequency diversity of a logical channel. Channel coding increases robustness by introducing redundancy into the logical channel. Interleaver depth influences performance in multipath fading. Finally, some logical channels in certain service modes delay transfer frames by a fixed duration to realize time diversity. This diversity delay also affects robustness, since it mitigates the effects of the mobile radio channel.

Table 5 through Table 15 show the active logical channels and their characterization parameters—throughput, latency, and relative robustness—for a given service mode. Of interest are the service modes that provide a logical channel for auxiliary application services. The bandwidth specifications are merely exemplary and real life performance may vary from the stated values.

TABLE 5

Logical Channels—Service Mode MP1

| Logical Channel | Throughput (kbps) | Latency (Seconds) | Relative Robustness | Purpose |
|---|---|---|---|---|
| P1 | 98.4 | 1.49 | 2 | MPS |
| PIDS | 0.9 | 0.09 | 3 | SIS |

TABLE 6

Logical Channels—Service Mode MP2

| Logical Channel | Throughput (kbps) | Latency (Seconds) | Relative Robustness | Purpose |
|---|---|---|---|---|
| P1 | 98.4 | 1.49 | 2 | MPS |
| P3 | 12.4 | 0.19 | 4 | MPS, PDS or AAS |
| PIDS | 0.9 | 0.09 | 3 | SIS |

TABLE 7

Logical Channels—Service Mode MP3

| Logical Channel | Throughput (kbps) | Latency (Seconds) | Relative Robustness | Purpose |
|---|---|---|---|---|
| P1 | 98.4 | 1.49 | 2 | MPS |
| P3 | 24.8 | 0.19 | 4 | MPS, PDS or AAS |
| PIDS | 0.9 | 0.09 | 3 | SIS |

TABLE 8

Logical Channels—Service Mode MP4

| Logical Channel | Throughput (kbps) | Latency (Seconds) | Relative Robustness | Purpose |
|---|---|---|---|---|
| P1 | 98.4 | 1.49 | 2 | MPS |
| P3 | 49.6 | 0.19 | 4 | MPS, PDS or AAS |
| PIDS | 0.9 | 0.09 | 3 | SIS |

TABLE 9

Logical Channels—Service Mode MP5

| Logical Channel | Throughput (kbps) | Latency (Seconds) | Relative Robustness | Purpose |
|---|---|---|---|---|
| P1 | 24.8 | 4.64 | 1 | MPS core |
| P2 | 73.6 | 1.49 | 2 | Enhanced audio for MPS |
| P3 | 24.8 | 0.19 | 4 | MPS, PDS or AAS |
| PIDS | 0.9 | 0.09 | 3 | SIS |

TABLE 10

Logical Channels—Service Mode MP6

| Logical Channel | Throughput (kbps) | Latency (Seconds) | Relative Robustness | Purpose |
|---|---|---|---|---|
| P1 | 49.6 | 4.64 | 1 | MPS core |
| P2 | 48.8 | 1.49 | 2 | Enhanced audio for MPS |
| PIDS | 0.9 | 0.09 | 3 | SIS |

TABLE 11

Logical Channels—Service Mode MP7

| Logical Channel | Throughput (kbps) | Latency (Seconds) | Relative Robustness | Purpose |
|---|---|---|---|---|
| P1 | 24.8 | 0.19 | 4 | MPS core |
| P2 | 98.4 | 1.49 | 2 | MPS, PDS, or AAS |
| P3 | 24.8 | 0.19 | 4 | MPS, PDS, AAS |
| PIDS | 0.9 | 0.09 | 3 | SIS |

TABLE 12

Logical Channels—Service Mode MS1

| Logical Channel | Throughput (kbps) | Latency (Seconds) | Relative Robustness | Purpose |
|---|---|---|---|---|
| S4 | 98.4 | 0.19 | 7 | MPS, PDS, AAS |
| S5 | 5.5 | 0.09 | 6 | MPS, PDS, or AAS |
| SIDS | 0.9 | 0.09 | 8 | SIS |

TABLE 13

Logical Channels—Service Mode MS2

| Logical Channel | Throughput (kbps) | Latency (Seconds) | Relative Robustness | Purpose |
|---|---|---|---|---|
| S1 | 24.8 | 4.64 | 5 | Core sound |
| S2 | 73.6 | 1.49 | 9 | Surround sound |
| S3 | 24.8 | 0.19 | 11 | MPS, PDS, or AAS |
| S5 | 5.5 | 0.09 | 6 | MPS, PDS, AAS |
| SIDS | 0.9 | 0.09 | 10 | SIS |

TABLE 14

Logical Channels—Service Mode MS3

| Logical Channel | Throughput (kbps) | Latency (Seconds) | Relative Robustness | Purpose |
|---|---|---|---|---|
| S1 | 49.6 | 4.64 | 5 | Core sound |
| S2 | 48.8 | 1.49 | 9 | Surround sound |
| S5 | 5.5 | 0.09 | 6 | MPS, PDS, AAS |
| SIDS | 0.9 | 0.09 | 10 | SIS |

TABLE 15

Logical Channels—Service Mode MS4

| Logical Channel | Throughput (kbps) | Latency (Seconds) | Relative Robustness | Purpose |
|---|---|---|---|---|
| S1 | 24.8 | 0.19 | 11 | Low bit-rate audio |
| S2 | 98.4 | 1.49 | 9 | MPS, PDS, or AAS |
| S3 | 24.8 | 0.19 | 11 | MPS, PDS, or AAS |
| S5 | 5.5 | 0.09 | 6 | MPS, PDS, or AAS |
| SIDS | 0.9 | 0.09 | 10 | SIS |

5.7 AM IBOC

Like FM IBOC, AM IBOC provides a hybrid waveform spectrum as well as a fully digital waveform spectrum. See, for example, Johnson, "The Structure and Generation of Robust Waveforms for AM In Band On Channel Digital Broadcasting," http://www.armstrongtx.com/BroadProd/Dt1DigitalFM.htm, which is hereby incorporated by reference in its entirety. The AM IBOC system provides four service modes: MA1, MA2, MA3, and MA4. Service modes MA1 and MA2 are used with the hybrid waveforms while service modes MA3 and MA4 are used with all digital waveforms. Service modes MA2 and MA4 provide higher throughput than MA1 and MA3, at the expense of robustness. Layer 1 of the AM IBOC system provides four logical channels to higher layer protocols: P1, P2, P3 and PIDS. P1, P2 and P3 are intended for general purpose audio and data transfer, while the PIDS logical channel is designed to carry the IBO data services (IDS) information. Tables 17 through 20 show the characterization parameters of each logical channel for each service mode.

TABLE 16

Logical Channels—Service Mode MA1

| Logical Channel | Throughput (kbps) | Latency (Seconds) | Relative Robustness | Purpose |
|---|---|---|---|---|
| P1 | 20.2 | 5.94 | 6 | General purpose audio and data transfer |
| P3 | 16.2 | 1.49 | 7 or 10 | General purpose audio and data transfer |
| PIDS | 0.4 | 0.19 | 4 or 8 | SIS |

TABLE 17

Logical Channels—Service Mode MA2

| Logical Channel | Throughput (kbps) | Latency (Seconds) | Relative Robustness | Purpose |
|---|---|---|---|---|
| P1 | 20.2 | 5.94 | 9 | General purpose audio and data transfer |
| P2 | 20.2 | 1.49 | 9 | General purpose audio and data transfer |

TABLE 17-continued

Logical Channels—Service Mode MA2

| Logical Channel | Throughput (kbps) | Latency (Seconds) | Relative Robustness | Purpose |
|---|---|---|---|---|
| P3 | 16.2 | 1.49 | 7 or 10 | General purpose audio and data transfer |
| PIDS | 0.4 | 0.19 | 4 or 8 | SIS |

TABLE 18

Logical Channels—Service Mode MA3

| Logical Channel | Throughput (kbps) | Latency (Seconds) | Relative Robustness | Purpose |
|---|---|---|---|---|
| P1 | 20.2 | 5.94 | 1 | General purpose audio and data transfer |
| P3 | 16.2 | 1.49 | 5 | General purpose audio and data transfer |
| PIDS | 0.4 | 0.19 | 3 | SIS |

TABLE 19

Logical Channels—Service Mode MA4

| Logical Channel | Throughput (kbps) | Latency (Seconds) | Relative Robustness | Purpose |
|---|---|---|---|---|
| P1 | 20.2 | 5.94 | 2 | General purpose audio and data transfer |
| P2 | 20.2 | 1.49 | 2 | General purpose audio and data transfer |
| P3 | 20.2 | 1.49 | 5 | General purpose audio and data transfer |
| PIDS | 0.4 | 0.19 | 3 | SIS |

5.8 IBOC Based Customer Relationship Management

IBOC systems that include logical channels for hosting an auxiliary application service (AAS) having bandwiths ranging from 5.5 Kbps to 98.4 Kbps have been described in Sections 5.1 through 5.6 above. In the present invention, this bandwidth capability is used to provide a novel customer relationship management service. In one embodiment of the present invention, customer relationship management data is broadcasted on IBOC AM or FM radio stations that support auxiliary application service functionality. Even with the large bandwidth that IBOC provides relative to Radio Data System (RDS/RDBS), it is simply not possible to provide a complete customer relationship management (CRM) service based on IBOC using a simple broadcast-limited scheme in which messages are sent to IBOC capable radio receivers implemented within the auxiliary application service framework that IBOC provides. To appreciate this, consider the case in which an automotive dealer in San Jose, Calif. wishes to let a particular customer know that their lease is expiring in two months. Using IBOC, this message is broadcast throughout the United States in order to reach the appropriate end-user. If one were to consider the collective size of all such unique messages that need to be sent to end-users in order to provide a comprehensive customer relationship management program, two problems quickly emerge. First, there is simply not enough bandwidth in IBOC to provide customizable messages to individual end-users using the proposed scheme. Second, end users would not have the patience to read through all such messages in the off chance that a message intended for them is sent.

The present invention solves the problems in the above scenario using three different techniques. First, in some embodiments, each IBOC receiver is provided with a lookup table with key attributes. Only messages containing a symbol that matches a key in the IBOC receiver lookup table are displayed to the user. Second, in some embodiments, time synchronization is employed. In such embodiments, an IBOC receiver only accepts data from a dedicated AAS service at discrete time points. In addition to these two novel features, some embodiments of the present invention support encryption so that privacy is ensured. Now that an overview of these features has been presented, more details of exemplary embodiments in accordance with the present invention will be presented.

5.9 IBOC Receiver Lookup Tables

In some embodiments, IBOC receivers in accordance with the present invention include a look-up table that includes keys. Then, only those messages received by a dedicated AAS service that include a key found in the lookup table are displayed on the IBOC receiver display. For example, for automotive customer relationship management, the lookup table may have the form of Table 20. It will be appreciated that vehicle identification numbers automatically include make, model, and year. However, in some instances, a vehicle identification number is not included in a customer relationship message because such specific addressing is either not needed or is not desirable.

TABLE 20

Exemplary Automotive Lookup Table

| Message type | Key |
|---|---|
| Make | 8 bits |
| Model | 8 bits |
| Year | 8 bits |
| Vehicle identification number | 32 bits |

Figure 9:
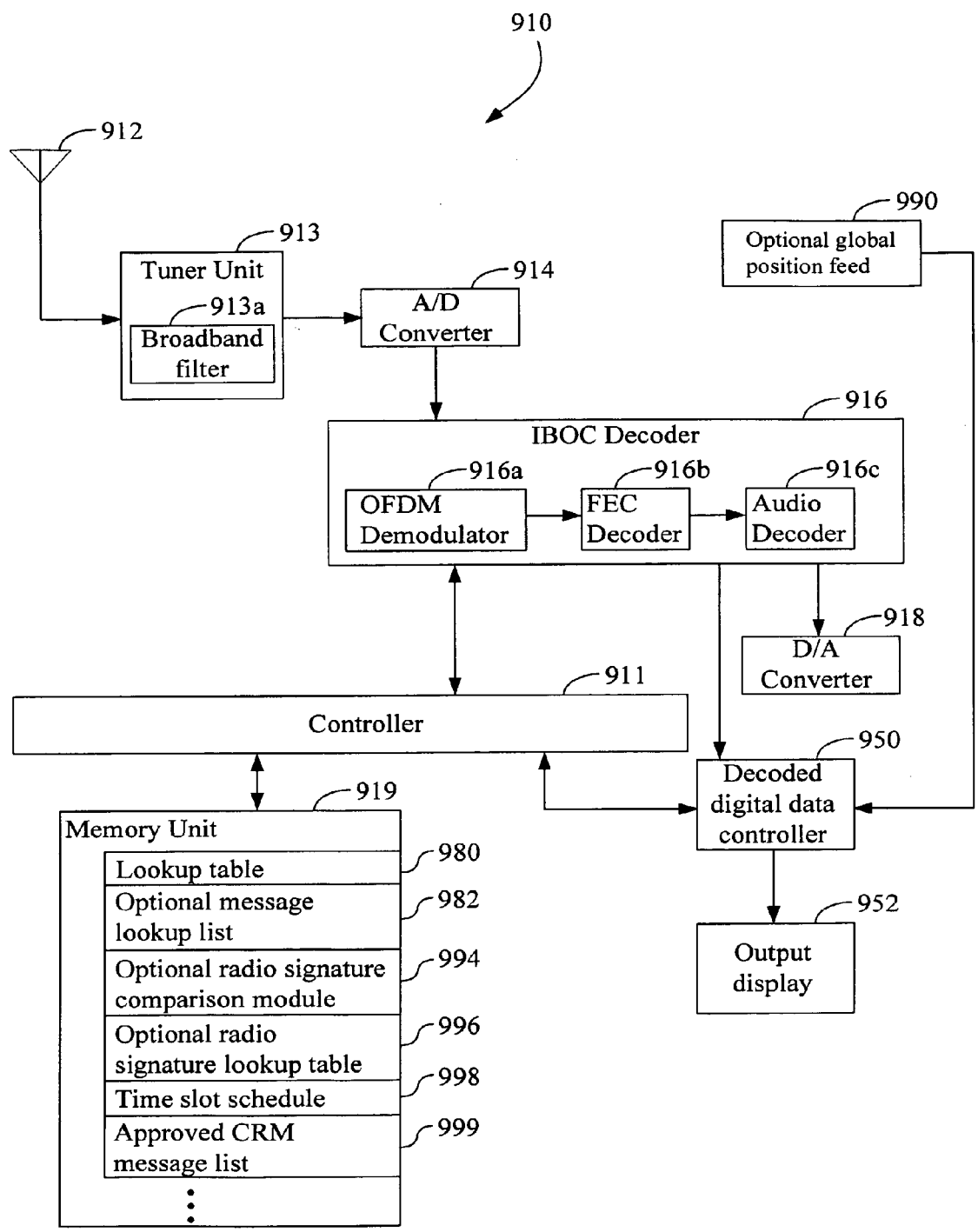
FIG. 9 illustrates an exemplary radio receiver in accordance with an embodiment of the present invention.

Reference will now be made to FIG. 9, which shows an exemplary radio receiver 910 in accordance with an embodiment of the present invention that includes a lookup table 980. IBOC broadcast receiver 910 according to the present embodiment is used in a vehicle and is adapted to receive a broadcast wave transmitted from an IBOC broadcast station that provides an IBOC-system digital audio broadcast (DAB) service such as the services described in Sections 5.1 through 5.6, above. In the IBOC broadcast receiver 910, the controller 911 is implemented by a microcomputer or the like. Controller 911 can be a component of tuner unit 913 or a standalone component. In some embodiments, the functionality of any of the control blocks illustrated in FIG. 9 is embedded in one or more application specific integrated circuits (ASICs) and/or field-programmable gate arrays (FPGAs). In some embodiments, controller 911 is implemented as one or more digital signal processors (DSPs). In such embodiments, controller 911 is realized as any combination of chips, including any combination of ASICs, FPGAs, DSPs, or other forms of microchips known in the art.

A tuner unit 913 tunes into the frequency of a broadcast wave (an FM or AM IBOC broadcast wave) received via antenna 912. Since a functional block involved in the frequency tuning is not directly associated with the substance of the present invention, that block is not illustrated. Tuner unit 913 includes a broadband filter 913a. Broadband filter 913a has a bandwidth (e.g., 400 kHz) that is suitable for receiving an IBOC broadcast wave.

An analog-to-digital (A/D) converter 914 converts the broadcast wave into a digital signal. An IBOC decoder 916 is connected with controller 911 to allow communication therewith. An IBOC decoder 916 has known functional blocks. The IBOC decoder 916 of FIG. 9 is merely exemplary of such known functional blocks. In the illustrated example, IBOC decoder 16 has an OFDM (orthogonal frequency division multiplexing) demodulator 916a, an FEC (forward error correction) decoder 916b, and an audio decoder 916c. When a broadcast wave selected by tuner unit 913 and output by A/D converter 914 has a digital modulation wave, i.e., an OFDM subcarrier, the OFDM demodulator 916a demodulates the OFDM subcarrier. The FEC decoder 916b decodes a forward error correction applied due to digital encryption and audio compression performed by a transmitting end (an IBOC broadcast station). When the broadcast wave selected and output as described above contains an OFDM subcarrier (a digital modulation wave), the OFDM demodulator 916a uses its demodulation function. Thus, an output of the OFDM demodulator 916a indicates that synchronization with a digital modulation wave is established. In some embodiments, radio 910 further includes an FM/AM demodulator in order to demodulate an FM/AM analog signal contained in the broadcast wave selected by tuner unit 913. Such functionality is disclosed, for example, in United States Patent Publication 2005/0003772 A1, which is hereby incorporated by reference in its entirety.

Audio signals output by the IBOC decoder 916 (the audio decoder 916c) is supplied to digital-to-analog (D/A) converter 918 which converts the digital audio signal into an analog audio signal. The analog audio signal output from the D/A converter 918 is amplified by an audio amplifier, which is not shown, and the resulting audio is listened to by a user via a speaker.

Non-audio decoded digital data output by IBOC decoder 916 (the audio decoder 916c) is supplied to decoded digital data controller 950. In some embodiments, non-audio decoded digital data has the structural format:

TABLE 21

Exemplary Messages Received by IBOC Radio

| Key | Display text |
|---|---|
| 101010193010101 | Please contact your local GM dealership for a 10% discount on a 30,000 mile checkup |
| . | . |
| . | . |
| . | . |
| 101010193010102 | Please contact your local GM dealership for a 10% discount on a 60,000 mile checkup |

In such embodiments, there is a string of messages. Each message is associated with (e.g., includes) a key. In the tabulated example above, a first message is directed to GM automobiles likely to need a 30,000 mile checkup whereas a second message is directed to GM automobiles likely to need a 60,000 mile checkup. Decoded digital data controller 950 parses each message by comparing the key associated with the message to lookup table 980. When there is a match between the key associated with the message and a key in lookup table 980, controller 950 allows the display text within the message to be sent to the output display 952. In some embodiments, display 952 is an 8 to 16 character alphanumeric display. In other embodiments, display 16 supports between 8 and 100 characters. In still other embodiments, display 16 is a graphical display.

In some embodiments, controller 950 is standalone circuitry. However, in other embodiments, controller 950 is implemented as a software module that can be stored in memory 919 associated with controller 911. In some embodiments controller 950 is a component of controller 911. In some embodiments, memory unit 919 further stores, for example, data regarding broadcast frequencies of receivable broadcast stations (e.g., IBOC broadcast stations).

Memory 919 can be random access memory (RAM). All or a portion of this RAM can be on board, for example, an FPGA or ASIC. In other words, in some embodiments, memory 919 and controller 911 are within the same chip. In some embodiments, memory 911 is external to microprocessor 911. In some embodiments, memory 919 is some combination of on-board RAM and external RAM. In some embodiments, memory 919 includes a read only memory (ROM) component and a RAM component.

In some embodiments, the codes found in messages are hierarchical in nature. For example, consider the case in which the messages are arranged according to make, model, year, and vehicle identification number. A given message may have a make code (e.g., General Motors, BMW, etc.). If this make code is present in lookup table 980 (and no other codes such as a model code or a year code are present in the message), then the display text within the message is displayed on output display 952. Alternatively, a given message may have a make code and a model code. If both the make code and the model code are present in lookup table 980 (and no year code is associated with the message), then the display text within the message is displayed on output display 952. In still another alternative, a given message may have a make code, a model code, and a year code. If all three codes are present in lookup table 980, then controller 950 will cause the associated display text within the message to be displayed on display 952. Alternatively, the message is stored in approved CRM message list 999 for display at a later time. CRM message list 999 can store a plurality of such messages and these messages can be displayed on a rotating basis on output display 952. For example, each of the messages in CRM message list 999 can be displayed on a round-robin basis on output display 952.

In some embodiments, a message can be sent to a specific automobile by placing a unique vehicle identification number in lookup table 980. Then, any message that is associated with a key matching this vehicle identification number will be displayed on output display 952.

An example of tiered keys has been provided in the automobile setting. However, any form of hierarchical or structured organization to keys can be used. And the invention is not limited to the automobile setting. In general, logic having the form shown in Table 22 can be used in which there are global classes, subclasses, sub-subclasses, etc. In one embodiment, the keys representing more global classes require less bits than keys representing more specific classes. For example, referring to table 2, $N<M<K$. In other embodiments, each key has the same number of bits (e.g., $N=M=K$). In such embodiments, a more general class can be specified by special bit values. For example, each key could be 20 bits long and classes could be signified by assigning the last 10 bits a high bit value (e.g., xxxxxxxxxx1111111111) whereas subclasses use the full 20 bits (e.g., xxxxxxxxxxxxxxxxxxxx). Thus, if lookup table 980 includes a specific class key (e.g., 10000000001111111111) and this key is received by controller 950, then the associated display text is sent to output display 252.

TABLE 22

Exemplary Lookup Table 980

| Message type | Key |
|---|---|
| Class | N bits |
| Subclass | M bits |
| Sub-subclass | K bits |
| . | |
| . | |
| . | |

5.10 IBOC Receiver Lookup Tables with Message Lookup List

Section 5.7 describes embodiments of the present invention in which messages are targeted for display by select radio receivers by matching keys associated with such messages with the keys found in radio receiver-based lookup tables. This represents a significant advance over the known art. However, in some instances, there is insufficient bandwidth to provide such directed messages. This is particularly the case when very specific targeting of end users (e.g., at the vehicle identification level) is required. To address this bandwidth limitation, some embodiments of the present invention provide a message lookup list 982 within, for example, memory unit 919.

Message lookup list 982 can take many forms. However, in general, message lookup list 982 is designed to reduce the amount of data that must be transmitted to IBOC radio receivers. Thus, in typical embodiments, message lookup list 982 comprises a plurality of codes and, for each code in the plurality of codes, a corresponding display text that is to be displayed when the code is received by the radio as illustrated in Table 23.

TABLE 23

Exemplary data structure for message lookup list 982

| Code | Display text |
|---|---|
| 1001 | Please contact your local GM dealership for a 10% discount on a 30,000 mile checkup |
| 1002 | Please contact your local GM dealership for a 10% discount on a 60,000 mile checkup |
| 1003 | It is time for an oil change, please contact your dealer |
| 1004 | Your dealer is having a special discount of 20% on all service during the month of July |
| . | |
| . | |
| . | |

When a message lookup list is present in the IBOC radio receiver, there is no longer a requirement that each transmitted message include the actual message to be displayed to the end-user. Thus, the size of the messages can be significantly reduced. For example, the exemplary messages described in Table 21 can now have the form:

TABLE 24

Exemplary Messages Received by IBOC Radio

| Key | Code |
|---|---|
| 101010193010101 | 1001 |
| . | . |
| . | . |
| . | . |
| 101010193010102 | 1002 |

It is apparent that the messages described in Table 24 are smaller than the corresponding messages in Table 21. Thus, the message lookup list 982 enables the use of smaller messages to convey the equivalent amount of information. When controller 950 receives a message of the form found in Table 24 (key+code), the controller first uses the key to determine whether the message will be ignored or displayed. When a determination is made that the message will be displayed, controller 950 performs a table lookup using message lookup list 982 and the code found in the message. This table lookup uniquely identifies a specific display text within list 982. The uniquely identified display text is then displayed on output display 952

In some embodiments of the present invention, the functionality of lookup table 980 and message lookup list 982 is integrated into a common table. For example, in some embodiments, each key in lookup table 980 has a corresponding display text that is displayed when a message containing the key is received by the radio. A lookup table 980 in accordance with such an embodiment of the present invention has the structure illustrated in Table 25.

TABLE 25

Exemplary Lookup Table 980

| Key Requirement | Display text |
|---|---|
| 101010193010101 | Please contact your local GM dealership for a 10% discount on a 30,000 mile checkup |
| . | . |
| . | . |
| 101010193010102 | Please contact your local GM dealership for a 10% discount on a 60,000 mile checkup |

In embodiments that have the structure illustrated in Table 25, all that is required in a message is a key. In other words, no display text or code need be present in a broadcast message. When controller 950 receives a message having a key found in table 980, the controller obtains the corresponding display text in table 980 and displays it on output display 952. Thus, the embodiment illustrated in Table 25 provides a way to significantly reduce the size of targeted broadcast messages.

In some embodiments, a display text is only displayed when combinations of keys or combinations of codes are present in a message. For example, in some embodiments, lookup table 980 has the form illustrated in Table 26.

TABLE 26

Exemplary Lookup Table 980

| Key Requirement | Code |
|---|---|
| 101010193010101 AND 101010193010102 | Please contact your local GM dealership for a 10% discount on a 30,000 mile checkup |
| . . . | . . . |
| 101010193010101 OR 101010193010102 | Please contact your local GM dealership for a 10% discount on a 60,000 mile checkup |

In embodiments that have the structure illustrated in Table 26, all that is required in a message is one or more keys. No display text or code need be present in the message. When controller 950 receives a message in such embodiments, the one or more keys specified in the message are used by controller 950 to obtain the corresponding display text in table 980. This display text is then displayed on output display 952. Alternatively, depending on the embodiment, the message can include the display text to be displayed or the message can include a code that is used in a lookup of message lookup list 982 to find the display text to be displayed in the manner described in embodiments above.

Figure 10:
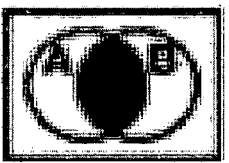
FIG. 10 illustrates exemplary known logical functions that are implemented in various embodiments of the present invention.
Figure 10:
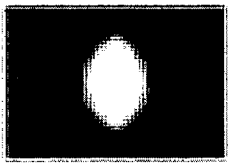
Figure 10:
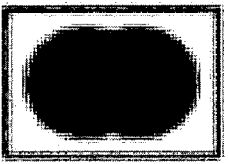
Figure 10:
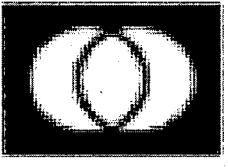
Figure 10:
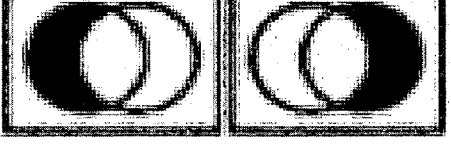
Figure 10:
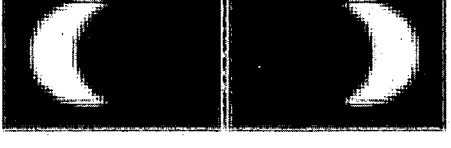
Figure 10:
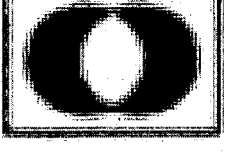
Figure 10:

In any of the above identified embodiments, complex key requirements (or complex code requirements when the logic is placed in optional lookup list 982) can be constructed using logical expressions found in the key requirements portion of lookup table 980. FIG. 10 illustrates some exemplary logical expressions that can be used to determine whether a given display text will be displayed on output display 952.

Although the expressions found in FIG. 10 can be used in cases where A and B represent single keys (or single codes), they are best applied in instances where keys A and B (or codes A and B) are in fact respective families of keys (or codes) such that there is some overlap between the two families. Logical expression 1 requires that the message include a key that is a member of both family A and B before a predetermined display text corresponding to the message (or contained within the message) is displayed on output display 952. Logical expression 2 allows the display text associated with a message that does not include a key that is a member of both A and B to be displayed on output display 952. Logical expression 3 allows the display text associated with a message that includes a key that is a member of A or B to be displayed on output display 952. Logical expression 4 displays the display text of any message that does not include a key that is a member of A or B on output display 952. Expression 5 is in fact two different logical but equivalent expressions. The first expression in (5) displays the display text of any message that has a key that is a member of family A but not a member of B. The second expression in (5) displays the display text of any message that has a key that is not a member of A but is a member of B. Expression 6 is also two different logical expressions. The first expression in 6 displays the display text of any message provided that, when the message includes a key that is a member of A, the key is also a member of B. The second expression in 6 displays the display text of any message provided that, when the message includes a key that is a member of B, the key is also a member of A. Expression 7 allows for the display of the display text of any message provided that the message either (i) has a key that is a member of A but not a member of B or (ii) has a key that is a member of B but is not a member of A. Expression 8 allows for the display of the display text of any message provided that the message either (i) has a key that is a member of A and B or (ii) has a key that not a member of either A or B.

The logic illustrated in FIG. 10 can be combined to form more complex logical expressions. In addition, other forms of logic can be used to determine what is displayed on output display 952. For example, lookup table 980 and or message lookup list 982 can in fact be a hash table.

In some embodiments, message lookup list 982 is present in memory 919 and lookup table 980 is not used. In such embodiments, all that is present in a customer relationship message is a code. This code is then used by controller 950 to identify a specific corresponding display text in message lookup list 982. In some embodiments such a code has a size of 8 bits and thus can uniquely designate any of 256 different messages in lookup list 982. In some embodiments, each code has a size of 16 bits and cans specify any of 64,000 messages in lookup list 982.

5.11 IBOC-Based Customer Relationship Management with a Global Positioning Feed In some embodiments, a global positioning feed is used to enhance the customer relationship management systems and methods of the present invention. For instance, in some embodiments, radio 910 either includes or is in electronic communication with optional global position feed 990. The global positioning information from this feed can serve as a key. For example, controller 950 can compare the key found in a newly received message with the global positioning feed. If the two keys match, indicating that receiver 910 is in the targeted geographic region, the display text associated with the message (either because the text is found within the message or because the message provides a code for table lookup in table 982) is displayed on output display 952.

While select broadcasting of customer relationship message at specific IBOC broadcasting stations provides a coarse way to geographically limit such messages, the use of a global positioning feed provides a much finer geographic control over such messages. In fact, a customer relationship message can include a first key that specifies a geographic region and a second key that specifies a tolerance or range for how far the receiving IBOC radio can be from the center of this specified geographic region and still qualify for display of the display text associated with the message. This second key, in essence, defines a boundary for the geographic region specified by the first key. Controller 950 reads the two keys in the message, reads the global position feed, and makes a determination as to whether the IBOC radio 10 is within the geographic region.

There is no limit to the type of electronic device that can provide global position feed 990. Several global position devices are well known in the art and are found in many automobiles. Exemplary electronic devices that can provide such a feed include, but are not limited to, the Garmin Streetpilot 2610 GPS, the Pharos Pocket GPS navigator, the Magellan Meridian GPS gold, the Garmin Etrex GPS, the NVAMAN pocket ICN 510, and the Kenwood KNA-DV41000 GPS. In addition to such known devices, U.S. Pat. No. 7,298, 328, entitled "Systems and Methods for Geographic Positioning Using Radio Spectrum Signatures," which is hereby incorporated by reference in its entirety, describes a novel technology that can be used to identify the geographic position of a radio by comparing a measured radio signature to radio signatures in a signature lookup table. A radio signature comprises a plurality of measured signal qualities that collectively represent a frequency spectrum. Each measured signal quality in the plurality of measured signal qualities corresponds to a portion of the frequency spectrum. In embodiments that use this technology, radio 910 includes a radio signature comparison module 994 for comparing a measured radio signature with any of a plurality of predetermined radio signatures found in a lookup table 996. The respective geographic position of each of the radio signatures in the plurality of predetermined radio signatures is known. Therefore, when a match is found between a measured radio signature and a radio signature found in lookup table 996, the location of the radio is determined to be the geographic location of the matching radio signature in lookup table 996.

5.12 Time Synchronization

Techniques for limiting the size of customer relationship management (CRM) messages transmitted to IBOC enabled radios have been described in the preceding sections. Such techniques include providing short codes that uniquely identify display text in lookup list 982 rather than providing the display text itself. This section describes another way, referred to as time synchronization, in which the limited bandwidth available in IBOC dedicated for use as an information channel can be used in order provide an adequate CRM program. The time synchronization approach described in this section can be used in conjunction with any of the other approaches described in the application.

In the time synchronization approach, memory 919 includes a time slot schedule 998. Time slot schedule 998 dictates when messages should be reviewed. There are many ways in which time slot schedule 998 can be used to implement time synchronization and all such ways are within the scope of the present invention. For example, when controller 950 receives a message, it can look up time slot schedule 998 to determine whether it is a permissible time. If it is not a permissible time, the message is ignored and the display text associated with the message is not displayed on output display 952. In preferred embodiments, controller 950 does not process messages during impermissible periods as determined by time slot schedule 998. This allows for power savings in which the processor "wakes up" only during allowed periods, as determined by time slot schedule 998, in order to process messages.

The time designations found in time slot schedule 998 may adopt any of a variety of formats. For instance, in some embodiments, time slot schedule 998 indicates a specific day of the week in which messages can be processed for display on output display 952. In other embodiments, time slot schedule 998 indicates a specific hour in the day, specific minutes each hour (e.g., the first five minutes of each hour, the twentieth through twenty-fifth minutes of each hour), a specific week in the month, a specific second in each minute, or any other time frame.

The advantage of using the time synchronization techniques described in this section is that they allow for the use of smaller address keys or codes. Consider the fact that there are approximately 330 million vehicles in the United States and Canada combined. Further, the global vehicle population is approaching 1 billion cars. To address such cars at the resolution of vehicle identification number (i.e., to uniquely address a specific vehicle in the global vehicle population) would require keys with 32 bit addressing, which can provide approximately 4.3 billion unique addresses. If, on the other hand, each vehicle had a time slot schedule 998, a smaller size key could be used to uniquely address such cars.

Time synchronization can be used in other ways as well. For instance, unique time slots could be assigned to each of the approximately fifty car manufacturer brands or to the approximately 1000 car models found worldwide. Each such model or brand could have a unique message lookup list 982. If time synchronization was used, there would be no need to ensure that the codes used in one model (or manufacturer brand) were unique relative to all other models (or manufacturer brands). Thus, smaller codes could be used.

In some embodiments, messages are collected for display on output display 952 at times when a vehicle is not in operation. For instance, consider the case in which a vehicle is not operated at night. The IBOC signal can be polled during this period for messages intended for radio 910. Time synchronization can be used to poll the IBOC signal at discrete time points during the period of vehicle inactivity. This provides substantial power savings and ensures that the car battery will not be drained by excessive use of controller 950 and other components of radio 910 described above. Thus, the radio can "wake up" at specific time points and poll the IBOC signal for relevant CRM messages. Such messages can then be stored by controller 950 in approved CRM message list 999 for display at a later time on output display 952.

In some embodiments radio 910 includes more than one tuner unit 913. In such embodiments, the additional tuner unit is used as a data dedicated tuner in order to increase the amount of bandwidth available to radio 910 in order to receive CRM messages. There are many ways in which such an additional tuner unit 913 can be incorporated into the architecture illustrated in FIG. 9. For example, the additional tuner could have its own A/D converter and IBOC decoder, controlled by controller 911 and feeding into controller 950.

5.13 Encryption

In some embodiments of the present invention, the keys, codes, and/or display text found in the CRM messages received by radio 910 are encrypted. In such embodiments, an additional role of controller 950 and/or controller 911 is to decrypt such messages. The advantage of such encryption is that it ensures privacy of messages provided in a CRM program. Suitable encryption algorithms are disclosed in, for example, Schneier, *Applied Cryptography: Protocols, Algorithms, and Source Code in C*, Second Edition, 1996, John Wiley & Sons, Inc.; Ferguson and Schneier, *Practical Cryptography*, 2003, Wiley Publishing Inc., Indianapolis, Ind.; Hershey, *Cryptography Demystified*, 2003, The McGraw-Hill Companies, Inc; Held & Held, *Learn Encryption Techniques with BASIC and C++*, 1999, Wordware Publishing, Inc., Plan Tex.; Singh, *The Code Book: The Science and Secrecy from Ancient Egypt to Quantum Cryptography*, 1999, Random House, Inc., New York; Mao, *Modern Cryptography: Theory and Practice*, HP Invent, Palo Alto, Calif.; Menezes et al., *Handbook of Applied Cryptography*, 1996, CRC Press; Kaufman et al., *Network Security Private Communication in a Public World*, 1995, Prentice-Hall, Inc., Upper Saddle River, N.J.; and Binstock and Rex, *Practical Algorithms for Programmers*, 1995, Chapter 3, Addison-Wesley, Reading, Mass., each of which is hereby incorporated by reference in its entirety. Suitable encryption techniques include, but are not limited to, public key encryption, secret key encryption, hash functions, the use of digital signatures, and/or the use of digital certificates.

6. CONCLUSION

All references cited herein are incorporated herein by reference in their entirety and for all purposes to the same extent as if each individual publication or patent or patent application was specifically and individually indicated to be incorporated by reference in its entirety for all purposes.

Many modifications and variations of this invention can be made without departing from its spirit and scope, as will be apparent to those skilled in the art. For example, CRM messages containing or referencing display text have been described. However, the CRM messages are not so limited. Such messages can contain audio or video messages as well. Alternatively, such messages can contain codes that reference audio messages that are stored in message lookup list 982. In addition, the application describes the use of IBOC for transmission of CRM messages. Through dimensional analysis it has been determined that lower bandwidth services such as RDS are not as suitable for the CRM functionality of the present invention at the VIN level. For example, assume a CRM message has a size of 64 bits (16 bits for the code, 32 bits for the key, and 16 bits for management overhead) and that RDS can transmit at a rate of 300 bits per second (25.9 Mbp/day). Thus, a given RDS station could broadcast $25.9 \times 10^6/64 = 405,000$ unique messages in a given day. This is not enough bandwidth for VIN level CRM in a market such as the Los Angeles area even if radio receivers were operating the entire day. However, RDS can be used to provide CRM to a limited number of vehicles (e.g., cars made by BMW, etc.) Satellite radio stations (e.g., XM, Siruis), on the other hand, do have the potential for providing sufficient bandwidth for CRM at the VIN level using the systems and methods of the present invention. However, at present, there are an insufficient number of satellite transmitters to implement the CRM systems and methods of the present invention at the VIN level in the United States. When more satellite stations are brought on line, the CRM systems and methods of the present invention can be implemented using satellite. In general, the minimum amount of throughput needed to provide the CRM services of the present invention are dependent on the level specificity desired (e.g., VIN level addressing). In some embodiments, a dedicated data bandwidth of at least 7-10 kbps is needed to implement the CRM systems and methods of the present invention at the VIN level of addressing. If VIN level addressing is not required, or was limited to a specific make of vehicle (e.g., BMWs), then lower dedicated bandwidths can be used to implement the CRM systems and methods of the present invention. As such, one aspect of the invention provides a method of providing customer relationship management in a radio system (e.g., IBOC, RDS, satellite). In the method a radio signal comprising a data portion wherein the data portion comprises a message is received. The message is parsed to obtain a key. The key is compared to a plurality of stored keys in a lookup table. When the key matches a stored key in the plurality of stored keys, a data structure associated with the message is outputted to an output device. When the key does not match any stored key in the plurality of stored keys, a data structure associated with the message is not outputted to the output device.

The specific embodiments described herein are offered by way of example only, and the invention is to be limited only by the terms of the appended claims, along with the full scope of equivalents to which such claims are entitled.

What is claimed is:

1. A method of providing customer relationship management in a radio system, the method comprising:
    tuning the radio system to a frequency band containing a locally-broadcast terrestrial radio signal;
    receiving said locally-broadcast terrestrial radio signal comprising a main signal component and a side data component wherein said side data component comprises a message;
    parsing said message to obtain a key;
    comparing said key to a plurality of stored keys in a lookup table; and
    when said key matches a stored key in said plurality of stored keys, said message is outputted to an output device, and
    when said key does not match any stored key in said plurality of stored keys, said message is not outputted to said output device.

2. The method of claim 1, wherein said locally-broadcast terrestrial radio signal is an IBOC- or an RDS-radio signal and wherein said frequency band is within the FM frequency spectrum.

3. The method of claim 1, wherein said locally broadcast terrestrial radio signal is an IBOC-radio signal and wherein said frequency band is within the AM frequency spectrum.

4. The method of claim 1, wherein said message is a display text, an audio segment, or a video segment.

5. The method of claim 1, wherein said output device is a speaker.

6. The method of claim 1, wherein said output device is a video display capable of displaying alphanumeric characters.

7. The method of claim 1, wherein said output device is a video display capable of displaying video characters.

8. The method of claim 1, wherein said message further comprises a received code, and wherein said method further comprises searching a message lookup list, the lookup list comprising a plurality of stored codes, for a stored code that matches said received code, wherein,
    when a stored code is found in said plurality of codes that matches said received code, a data structure associated with said matching stored code is the data structure outputted to said output device.

9. The method of claim 8 wherein said code has a size of 8 bits or 16 bits.

10. The method of claim 1 wherein said key has a size of 32 bits.

11. The method of claim 1, wherein said message is encrypted, and wherein the method further comprises decrypting said message prior to said parsing.

12. The method of claim 1, the method further comprising reading a time slot schedule to identify a permitted time, and wherein said receiving, parsing, and comparing are only performed during said permitted time.

13. The method of claim 12 wherein said permitted time is a specified time interval occurring in a time period.

14. The method of claim 13 wherein said time period is a minute, an hour, a day, a week or a month.

15. A device comprising:
    a lookup table comprising a plurality of stored keys;
    an output device;
    a tuner unit for tuning into and receiving a locally-broadcast terrestrial radio signal comprising a main signal component and a side data component wherein said side data component comprises a message;
    a decoded digital data controller in electrical communication with (i) said lookup table, (ii) said output device, and (iii) said tuner unit, said decoded digital data controller comprising:
        instructions for parsing said message to obtain a key, and
        instructions for comparing said key to said plurality of stored keys;
    wherein
        when said key matches a key in said plurality of stored keys, said message is outputted to an output device, and
        when said key does not match any key in said plurality of stored keys, said message is not outputted to an output device.

16. The device of claim 15, wherein said ocally-broadcast terrestrial radio signal is an IBOC- or a RDS-radio signal and wherein said locally-broadcast terrestrial radio signal is within the FM frequency spectrum.

17. The device of claim 15, wherein said locally broadcast terrestrial radio signal is an IBOC-radio signal and wherein said locally-broadcast terrestrial radio signal is within the AM frequency spectrum.

18. The device of claim 15, wherein said message is a display text, an audio segment, or a video segment.

19. The device of claim 15, wherein said output device is a speaker.

20. The device of claim 15, wherein said output device is a video display capable of displaying alphanumeric characters.

21. The device of claim 15, wherein said output device is a video display capable of displaying video characters.

22. The device of claim 15, the device further comprising:
a message lookup list, the lookup list comprising a plurality of stored codes; and wherein said message further comprises a received code, and wherein
said decoded digital data controller further comprises instructions for searching said message lookup list for a stored code that matches said received code,
wherein,
when a stored code is found in said plurality of stored codes that matches said received code, a data structure associated with said matching stored code is the data structure outputted to said output device.

23. The device of claim 22 wherein said code has a size of 8 bits or 16 bits.

24. The device of claim 15 wherein said key has a size of 32 bits.

25. The device of claim 16, wherein said message is encrypted, and wherein the decoded digital data controller further comprises instructions for decrypting said message prior to said parsing.

26. The device of claim 15, the device further comprising:
a time slot schedule; wherein
said decoded digital data controller further comprises instructions for reading said time slot schedule to identify a permitted time, and wherein said instructions for parsing, and said instructions for comparing are only performed during said permitted time.

27. The device of claim 26 wherein said permitted time is a specified time interval occurring in a time period.

28. The device of claim 15 wherein said time period is a minute, an hour, a day, a week or a month.

29. The device of claim 15, the device further comprising a time slot schedule, and wherein said decoded digital data controller further comprises instructions for polling said time slot schedule, wherein said instructions for parsing and said instructions for comparing are not performed during a time not permitted by said time slot schedule.

* * * * *